US008627785B2

(12) United States Patent
Grace et al.

(10) Patent No.: US 8,627,785 B2
(45) Date of Patent: Jan. 14, 2014

(54) MOUTHPIECE-VENTED TEAT CUP INFLATION

(75) Inventors: Patrick P. Grace, Melksham (GB); Thomas P. Novotny, Johnson Creek, WI (US)

(73) Assignee: Avon Polymer Products Limited, Wiltshire (GB)

( * ) Notice: Subject to any disclaimer, the term of this patent is extended or adjusted under 35 U.S.C. 154(b) by 155 days.

(21) Appl. No.: 12/915,723

(22) Filed: Oct. 29, 2010

(65) Prior Publication Data

US 2011/0126768 A1    Jun. 2, 2011

Related U.S. Application Data (60) Provisional application No. 61/265,953, filed on Dec. 2, 2009.

(51) Int. Cl.
*A01J 5/04*    (2006.01)
(52) U.S. Cl.
USPC ............ 119/14.47; 119/14.49; 119/14.36
(58) Field of Classification Search
USPC .......... 119/14.47, 14.01, 14.49, 14.02, 14.52, 119/14.51, 14.36
See application file for complete search history.

(56) References Cited

U.S. PATENT DOCUMENTS

| 2,502,362 | A | | 3/1950 | Babson et al. | |
|---|---|---|---|---|---|
| 2,944,514 | A | * | 7/1960 | Nesseth | 119/14.49 |
| 3,255,732 | A | | 6/1966 | Raht | |
| 3,476,085 | A | * | 11/1969 | Noorlander | 119/14.36 |
| 3,482,547 | A | | 12/1969 | Maier | |
| 3,659,558 | A | | 5/1972 | Noorlander | |
| 4,090,471 | A | | 5/1978 | Thompson | |
| 4,303,038 | A | | 12/1981 | Thompson et al. | |
| 4,530,307 | A | | 7/1985 | Thompson | |
| 4,604,969 | A | | 8/1986 | Larson | |
| 4,936,254 | A | | 6/1990 | Marshall | |
| 5,069,162 | A | | 12/1991 | Thompson et al. | |
| 5,134,967 | A | | 8/1992 | Marshall | |
| 5,161,482 | A | | 11/1992 | Griffin | |
| 6,055,931 | A | * | 5/2000 | Sanford, Jr. | 119/14.36 |
| 6,164,243 | A | * | 12/2000 | Larson | 119/14.49 |

(Continued)

FOREIGN PATENT DOCUMENTS

| CN | 1296379 A | 5/2001 |
|---|---|---|
| CN | 1976579 A | 6/2007 |

(Continued)

OTHER PUBLICATIONS

D.M. McGrath and J. O'Shea, Effect of Teat-Cup Liner Design on Milking Characteristics, Irish Journal of Agricultural Research, vol. 11, No. 3, 1972, pp. 339-349.

(Continued)

*Primary Examiner* — Andrea Valenti
(74) *Attorney, Agent, or Firm* — McGarry Bair PC (57) ABSTRACT

A teat cup inflation comprises a mouthpiece having a vent for the limited admission of ambient air into the inflation barrel above the lower tip of the teat. One or more airflow passages are formed by the configuration of the barrel and extend along the length of the barrel to vent air from mouthpiece to the short milk tube. The one or more airflow passage can be formed between the sides of barrels that are multisided in cross-section.

26 Claims, 5 Drawing Sheets

(56) References Cited

U.S. PATENT DOCUMENTS

| | | |
|---|---|---|
| 6,308,655 B1 | 10/2001 | Oosterling |
| 6,546,893 B1 | 4/2003 | Happel et al. |
| 6,640,744 B2 * | 11/2003 | Lincke ................. 119/14.47 |
| 6,997,136 B1 | 2/2006 | Coates |
| 7,290,498 B2 | 11/2007 | Shin |
| 7,293,527 B2 * | 11/2007 | Shin ..................... 119/14.47 |
| 7,578,260 B2 | 8/2009 | Shin |
| 7,882,803 B2 * | 2/2011 | Petersson ............. 119/14.47 |
| 8,240,272 B2 * | 8/2012 | Duke ..................... 119/14.37 |
| 2005/0284379 A1 | 12/2005 | Shin |
| 2006/0005772 A1 * | 1/2006 | Shin ..................... 119/14.52 |
| 2008/0072825 A1 | 3/2008 | Peterson |
| 2009/0050061 A1 | 2/2009 | Duke |

FOREIGN PATENT DOCUMENTS

| | | | |
|---|---|---|---|
| DE | 1607027 | | 7/1970 |
| DE | 10056224 A1 | | 5/2002 |
| EP | 1219166 A2 | | 7/2002 |
| EP | 1334656 A1 | | 8/2003 |
| GB | 644168 | * | 10/1950 |
| GB | 1463341 | | 2/1977 |
| WO | 8905577 | | 6/1989 |
| WO | 0067560 | | 11/2000 |

OTHER PUBLICATIONS

A.D Meyer and P.D. Thompson, Milking Vacuum Measurements in Mouthpiece Chamber of Teat Cup Inflations, Dairy Equipment Company, Madison Wisconsin, 9 pages, Jun. 1979.

Yuan Hai, Search Report, May 10, 2013, 2 pages, Jiangsu, China.

* cited by examiner

MOUTHPIECE-VENTED TEAT CUP INFLATION

CROSS-REFERENCE TO RELATED APPLICATION

This application claims the benefit of U.S. Provisional Patent Application No. 61/265,953, filed Dec. 2, 2009, which is incorporated herein by reference in its entirety.

BACKGROUND OF THE INVENTION

1. Field of the Invention

The invention relates to liners or inflations for teat cup assemblies for automatic milking machines. In one of its aspects, the invention relates to a teat cup inflation having a vent located in the mouthpiece. In another if its aspects, the invention relates to a teat cup inflation having a multi-sided cross-section. In another if its aspects, the invention relates to a teat cup inflation having an air passageway formed in the inflation to vent air from the upper to the lower portion of the inflation.

2. Description of Related Art

Teat cup assemblies are used in automatic milking machines for milking cows. The teat is inserted into the teat cup assembly. During the milking operation, a vacuum is maintained in the milking machine claw, dilating the teat orifice, drawing milk from the teat, through the barrel portion of the inflation and through the short milk tube section into the milker claw. The pulsation chamber between the shell and the barrel is connected to a pulsator on the milking machine. The pulsator periodically opens a connection between the pulsation chamber and atmospheric pressure, collapsing the liner's barrel to a closed position. When in this closed position, the barrel compresses the teat tissue to close the teat orifice, interrupting the flow of milk from the teat. The flow of milk from the teat resumes when the barrel returns to a normally open position in response to the pulsator subsequently connecting the pulsation chamber to vacuum.

Heretofore, a vent has been placed in either the short milk tube section of the inflation or in the claw to assist the flow of milk away from the milking cluster, and onward through the milk transport system. When the vent is placed in the short milk tube, not only the claw, but also the short milk tube is kept clear of milk by the air flow entering the vent. Venting the inflation in the mouthpiece improves flow of milk away from the teat, while continuing to assist milk flow through the short milk tube and claw. Locating the vent in the mouthpiece also advantageously limits the vacuum experienced by the teat.

Traditional milking inflations are round in cross-section and are made easily in machine molds, simplifying the manufacture of the inflation. It is apparent, however, that both natural calf suckling and hand milking, both of which are generally accepted as allowing complete and effective milking without undue stress to the teat, begin with a non-round structure presented to the teat. The structure becomes even less round as each compression or suction cycle of milking proceeds, either by motion of the tongue against the palate in the case of a suckling calf, or by closure of the hand in the case of hand milking. It is now generally accepted that non-round cross-sections of the liner barrel can provide effective milking; examples being oval, triangular, square, and corrugated inflation barrels. U.S. Pat. No. 2,502,362 to Babson et al., issued Mar. 28, 1950, describes a teat cup assembly comprising a rigid tubular outer shell surrounding a flexible tubular inflation wherein the inflation and the interior surfaces of the shell have a triangular cross-section.

GB644168 to Burry, published Oct. 4, 1950 discloses a teat cup liner 1 that has a bulbous mouthpiece 3 that is provided with a small hole 10 for the limited admission of air to the space within the mouthpiece. The barrel of the teat cup liner 1 has a flattened cross section that can be oval or elliptical. The small hole is said to be next to the udder and the limited admission of air into the space reduces the degree of suction and avoids the application of excessive vacuum on the udder without detriment to the good milking vacuum applied lower down at the orifice of the teat. The orifice can be metered and formed with a rivet-like device.

DE1607027 to Bildshausen et al., published Jul. 9, 1970 discloses a liner 4 having a ventilation hole 18 located at the head 2 of the liner 4, and one or more grooves that run lengthwise along the shaft of the liner.

U.S. Pat. No. 7,578,260 to Lauren AgriSystems, Ltd. discloses a liner that includes a vent in the milk tube below the teat position. Lauren contemplates different liner cross-sectional configurations and channels are located at the apex of a collapsed triangular liner.

SUMMARY OF THE INVENTION

According to the invention, a teat cup liner for use in a milking machine for the milking of mammals is constructed so there is communication between a mouthpiece and an inflation barrel when vacuum is applied to the teat cup liner, generating a continuous sweeping flow of air from the mouthpiece down along at least a portion of the length of the inflation barrel and a teat. The mouthpiece has an open top and a tubular side wall portion that is adapted to mount to a teat cup shell, and the tubular side wall portion further includes a vent hole that is adapted to admit a controlled amount of ambient air into the mouthpiece of the liner. The inflation barrel is connected to the mouthpiece and adapted in its uncollapsed condition to receive a teat and to close onto the teat in its collapsed condition, the barrel having a multi-sided cross-sectional configuration that forms at least three air passages along at least a portion of the length thereof from the mouthpiece through the barrel for flow of air from the mouthpiece through the barrel when the barrel is in the collapsed condition to facilitate air and milk flow to and through a region beneath the teat to a milk tube.

In one embodiment, the cross-sectional configuration of the barrel is multi-sided when the barrel is in an uncollapsed condition. The at least three air passages can be formed between the sides of the multi-sided barrel when the barrel is in the collapsed condition.

In a preferred embodiment, the barrel has three sides when the barrel is in the uncollapsed condition and forms three air passages between the three sides of the barrel. In this embodiment, the three air passages are formed between each of the three sides when the barrel is in the collapsed condition. In addition, an air passage can also be formed within a central area between the three sides and beneath the teat when in the collapsed condition. The central area has a rounded configuration rather than a sharp obtuse angle in each of the sides of the barrel.

The vent hole can be made in many different forms. For example, the vent hole can be cylindrical, tapered, stepped, or it can be round or irregular non-circular in cross-section. The shape of the hole may be adapted to minimize the likelihood of plugging from dirt or foreign matter. The plug can be retained by elasticity of mouthpiece, by mechanical interconnection between the plug and the tubular side wall portion of the mouthpiece, or by an adhesive connection between the plug and the tubular side wall portion of the mouthpiece.

In one embodiment, the vent hole can be sized to admit from 1 to 15 liters of air per minute averaged over a complete cycle of a pulsator. In addition, the vent hole can have a diameter in the range from about 0.022 to about 0.09 in. (0.5 to 2.0 mm), preferably in the range of about 0.031 to 0.045 in. (0.7 to 1.0 mm) and most preferably about 0.045 in. (1.0 mm). In an alternative embodiment, the vent hole can be formed by a vent plug that is placed in the tubular side wall portion of the mouthpiece.

Further according to the invention, a teat cup comprises a rigid teat cup shell and a teat cup liner according to any of the teat cup embodiments described above.

Further according to the invention, a teat cup assembly for use in a milking machine for the milking of mammals comprises a rigid teat cup shell having an elongated body with an annular wall terminating at an upper rim defining an open upper end, and a teat cup liner received within the open upper end of the teat cup shell, the teat cup liner constructed so there is communication between a mouthpiece and an inflation barrel when vacuum is applied to the teat cup liner, generating a continuous sweeping flow of air from the mouthpiece down along at least a portion of the length of the inflation barrel and the teat. The mouthpiece has an open top and a tubular side wall portion mounted to the rim of the teat cup shell, and the tubular side wall portion further includes a vent hole that is adapted to admit a controlled amount of ambient air into the mouthpiece of the linear. The inflation barrel extends into the elongated body of the teat cup shell and connected to the mouthpiece to receive a teat when the barrel is in an uncollapsed condition and adapted to close onto the teat in a collapsed condition, the barrel having a triangular cross-sectional configuration that forms one or more air passages along at least a portion of the length thereof for flow of air from the mouthpiece when the barrel is in the collapsed condition to facilitate air and milk flow to and through a region beneath the teat to a milk tube.

In one embodiment, the cross-sectional configuration of the barrel is triangular when the barrel is in the uncollapsed condition. The one or more air passages are formed between the sides of the barrel when the barrel is in the collapsed condition.

In a preferred embodiment, the barrel forms three air passages between the sides of the barrel when the barrel is in the collapsed condition. The barrel triangular cross-sectional configuration has three sides joined at three apices when the barrel is in the uncollapsed condition, and the one or more air passages are formed at the apices when the barrel is in the collapsed condition. The one or more passages are formed between the apices and the teat along the length of the teat, and an air passage may be formed at each of the apices. In one embodiment, the apices have an increased thickness compared to the sides.

The vent hole can be made in many different forms. For example, the vent hole can be cylindrical.

In one embodiment, the vent hole can be sized to admit from 1 to 15 liters of air per minute averaged over a complete cycle of a pulsator. In addition, the vent hole can have a diameter in the range of about 0.031 to 0.045 in. (0.7 to 1.0 mm) and preferably about 0.045 in. (1.0 mm).

These and other features and advantages of the invention will become apparent from the detailed description below, in light of the accompanying drawings.

DETAILED DESCRIPTION OF THE DRAWINGS

Figure 1:
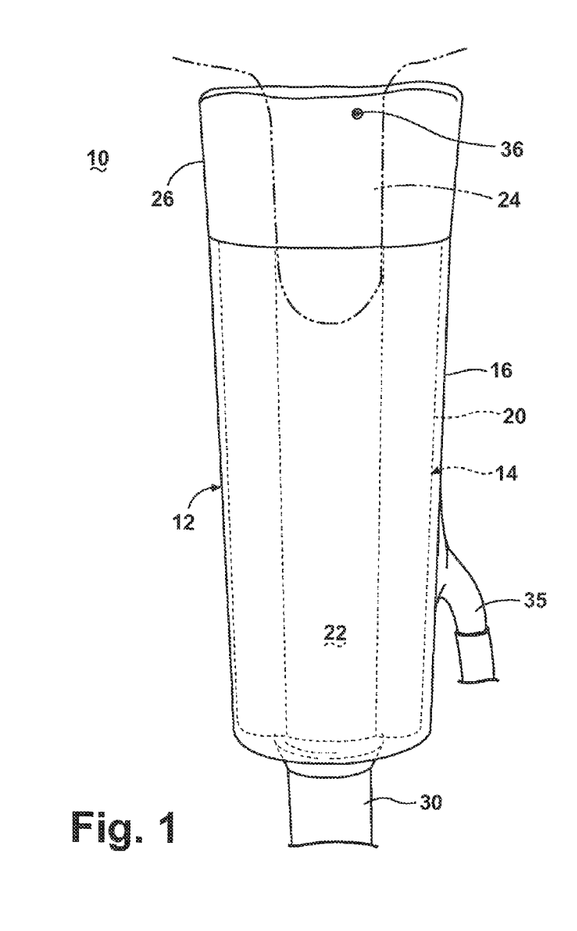
FIG. 1 shows a perspective view of a teat cup assembly according to a first embodiment of the invention.
Figure 2:
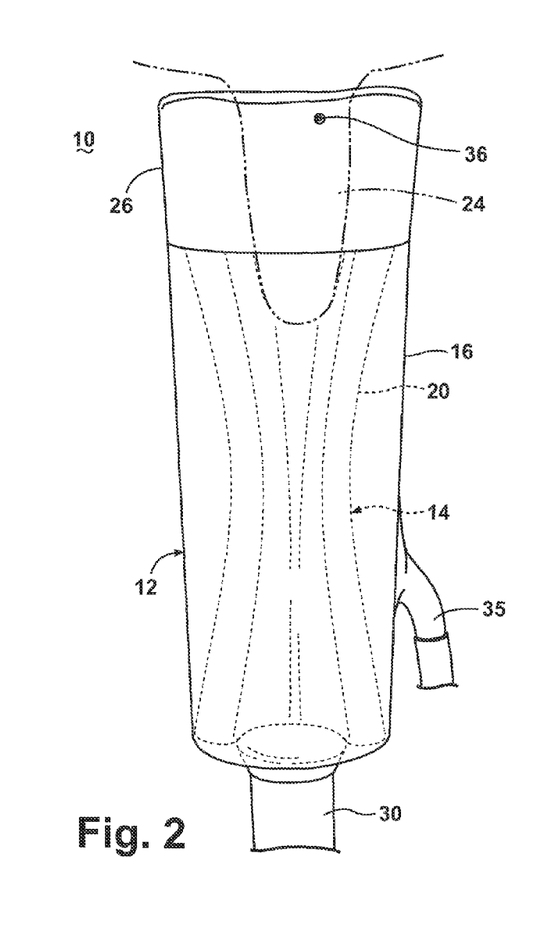
FIG. 2 shows a perspective view of the teat cup assembly of FIG. 1, illustrating a collapsed barrel of the inflation.

Referring now to the drawings and specifically to FIGS. 1-2, a teat cup assembly 10 comprises a rigid, generally cylindrical outer shell 12 and an inflation 14. The outer shell 12 is a hollow, elongated body comprising an annular wall 16 and an open upper end terminating in a rim 18 (see FIGS. 3-4). The shell 12 can be formed from a metal, such as stainless steel, or a non-metallic material, such as a synthetic thermoplastic or thermosetting material. As used herein, the term "inflation" is synonymous with the term "liner" which is also used in the milking machine art.

Figure 5:
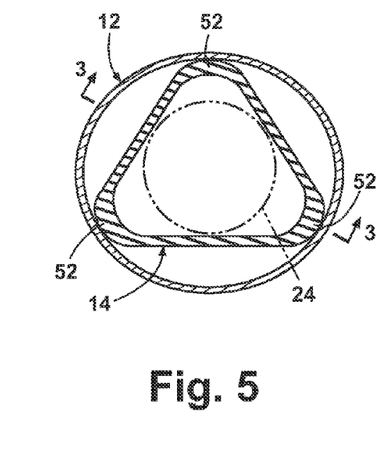
FIG. 5 is a horizontal cross-sectional view of the teat cup assembly of FIG. 1 taken along line 5-5 of FIG. 3, illustrating an uncollapsed barrel of the inflation.

The inflation 14 is a tubular member formed from a flexible elastomeric material such as natural or synthetic rubber. The inflation 14 comprises an elongated, tubular upper portion or barrel 20 which defines a duct 22 for receiving a cow's teat 24 in a generally conventional manner. As illustrated in FIG. 5, the barrel 20 is triangular in cross-section, such as is disclosed in the co-owned U.S. Pat. No. 6,164,243, entitled "Milking Inflation", which is incorporated herein by reference in its entirety. Other inflation cross-sectional geometries are also feasible, including square, pentagon, hexagon, heptagon, octagon other multi-sided shapes and corrugated.

Figure 3:
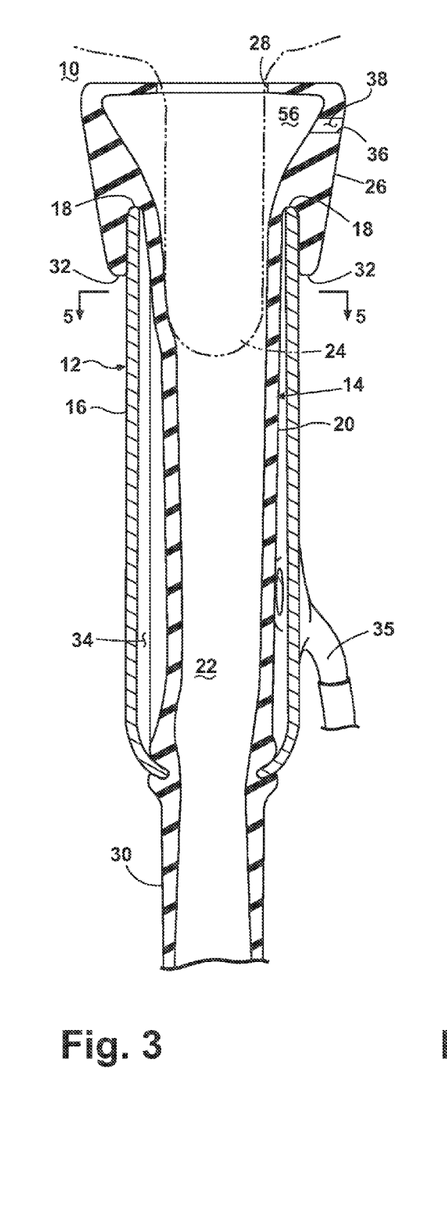
FIG. 3 is a vertical cross-sectional view of the teat cup assembly of FIG. 1, taken along line 3-3 of FIG. 5.
Figure 4:
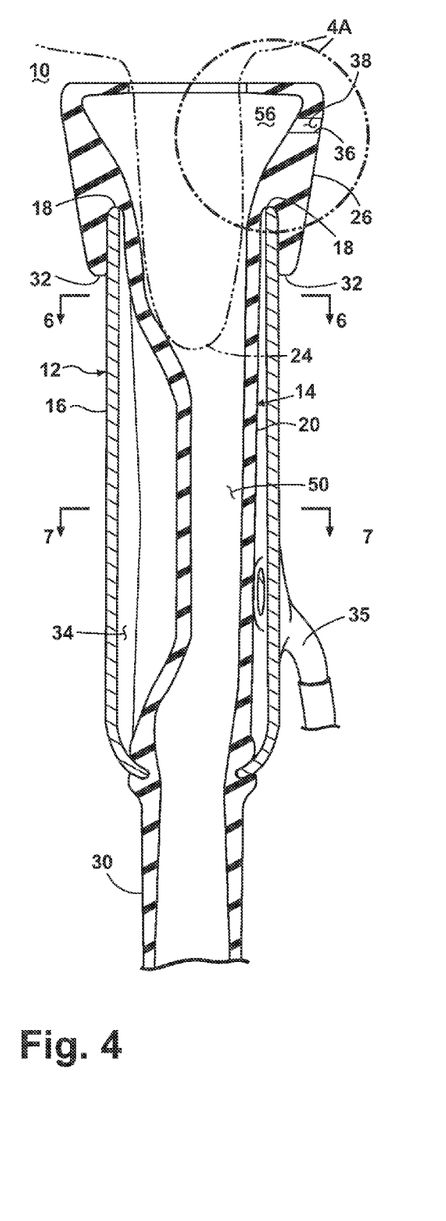
FIG. 4 is a vertical cross-sectional view of the teat cup assembly of FIG. 2, taken along line 4-4 of FIG. 6 and illustrating a collapsed barrel of the inflation.

Referring to FIGS. 3-4, the inflation 14 further comprises a mouthpiece portion 26 which has a tubular side wall portion that fits over the upper end of the shell 12 and has an opening 28 through which a teat 24 extends, and an elongated, generally cylindrical short milk tube section 30 of reduced diameter which extends from the lower end of the shell 12 and is slipped onto a nipple of the milker claw (not shown).

The mouthpiece portion 26 of the inflation 14 has a peripheral, downwardly extending cuff 32 which surrounds and fits snugly over the upper end of the shell 12 and sealingly engages the rim 18. The short milk tube section 30 forms a seal with the shell 12, and a sealed pulsation chamber 34 is defined between the interior wall 16 of the shell 12 and the inflation barrel 20.

The milking operation of the teat cup assembly 10 is as follows. A vacuum is maintained in the milker claw, and thus, inside the inflation 14 after installation on a teat 24. The suction causes milk to flow from the teat 24, through the inflation barrel 20 and short milk tube section 30, into the milker claw. A pulsator (not shown) is fluidly connected via suitable tubing (not shown) to a nipple 35 located on the shell 12. The pulsator controls the collapse of the barrel 20 to a closed position to interrupt the milk flow by compressing the end of the teat 24. The pulsator functions to alternately connect the pulsation chamber 34 to atmospheric pressure and to connect the pulsation chamber 34 to a vacuum. Connecting the pulsation chamber 34 to atmospheric pressure collapses the barrel 20 as a result of the differential pressure between vacuum inside the barrel 20 and atmospheric pressure inside the pulsation chamber 34. The pulsator cycles back to a vacuum and substantially equal vacuum inside the inflation barrel and outside of the barrel (in the pulsation chamber 34). As a result, the barrel 20 returns to its normally open position to permit resumption of milk flow.

In a first embodiment of the invention, the mouthpiece portion 26 further includes a small air vent hole 36 for the limited admission of ambient air into the mouthpiece portion 26 and duct 22. The vent hole 36 is located above the lower tip of the teat 24 for the admission of air into the system above the lower end of the teat 24. The vent hole 36 is molded as an integral part of the inflation 14 and is sized accordingly for admitting the desired quantity of ambient air into the duct 22. The vent hole 36 extends through the thickness of the mouthpiece portion 26 and defines an air channel 38 into the mouthpiece portion 26 from the atmosphere. The vent hole 36 is generally sized to admit from 1 to 15 liters of air per minute, averaged over a complete cycle of the pulsator. The size of the hole diameter can range from about 0.022 to 0.09 in. (0.5 to 2.0 mm), and preferably about from about 0.031 to 0.045 in. (0.7 to 1.0 mm), and specifically about 0.045 in. (1.0 mm). It has been found that locating a vent hole 36 above the teat 24 lower portion creates a more even pressure drop and thus a steady and evenly distributed flow of air, through the system. It is further understood that making the vent hole 36 larger than 2 mm will nevertheless allow proper functioning of the teat cup inflation 14 of this invention, but may cause difficulties elsewhere in the milking machine, for example, with the capacity of the vacuum pump. Similarly, it is further understood that making the vent hole 36 smaller than 0.5 mm will not impair proper functioning of the teat cup inflation 14 of this invention, but may cause difficulties elsewhere in the milking machine, for example, by inability to sweep milk along any sections of milk tubing or fixed pipe having a vertical component to the direction of milk flow.

Figure 4A:
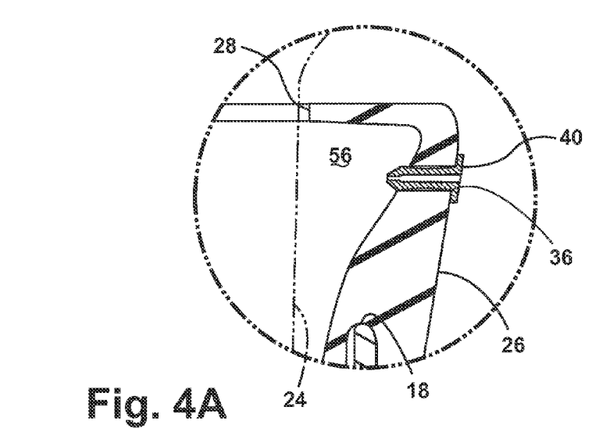
FIG. 4A is a detail view of the portion of the teat cup assembly illustrated in the circular area of FIG. 4 according to a second embodiment of the invention.

Referring to FIG. 4A, in a second embodiment of the invention, a vent plug 40 is inserted into an opening formed in the mouthpiece portion 26. It is contemplated that the vent plug 40 can be cylindrical, tapered, or have any other suitable profile. The vent plug 40 can incorporate an insert for self-cleaning purposes. Further, the vent plug 40 is retained in the mouthpiece portion 26 opening by any suitable means. Non-limiting examples of such retention means include snapping-in, peening, clinching, and adhesives.

Figure 6:
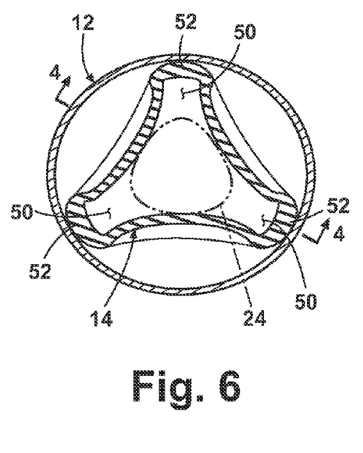
FIG. 6 is a horizontal cross-sectional view of the teat cup assembly of FIG. 2 taken along line 6-6 of FIG. 4, illustrating a collapsed inflation at a teat.
Figure 7:
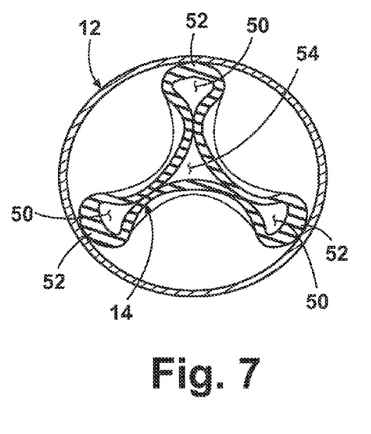
FIG. 7 is a horizontal cross-sectional view of the teat cup assembly of FIG. 2 taken along line 7-7 of FIG. 4, illustrating a collapsed barrel of the inflation beneath a teat.

Referring to FIGS. 5-7, airflow passages 50 are provided longitudinally parallel to the axis of the barrel 20 and extend the length of the barrel 20 to enable the flow of air from mouthpiece portion 26 to the short milk tube section 30. The airflow passages 50 are formed by a collapsed barrel 20, the collapse of which occurs during the milking operation as described above. The collapsed triangular barrel 20 will inherently have airflow passages 50 formed at each apex 52 of the triangle. In the region in which the teat 24 extends, the air passages 50 are formed between the teat 24 and the apices 52 of the triangular barrel 20 as illustrated in FIG. 6. In the region below the teat 24, the air passages 50 are formed at the apices 52 of the collapsed barrel 20. The thickness of the barrel 20 at the apices 52 and the internal radii of the barrel 20 prevent full collapse of the barrel 20. In other words, the faces of the triangle do not entirely meet, leaving a gap that forms the air passages 50.

Additionally, in the region below the teat 24, a central air passage 54 as depicted in FIG. 7, is formed due to the three flat faces of the triangular barrel 20 resisting the pressure difference between the vacuum inside the barrel 20 and atmospheric pressure in the pulsation chamber 34 sufficiently that they do not meet in their entirety. This central passage 54 provides a conduit for continuing drainage of milk drawn from the teat 24 during the previous open phase of pulsation shown in FIG. 5, and also ensures full vacuum is available at the teat 24 end to ensure proper closure of the inflation barrel 20. The central air passage 54 has a rounded configuration rather than a sharp obtuse angle in each of the sides of the barrel.

An annular mouthpiece cavity 56 formed between the inflation mouthpiece 26 and the teat 24 receives the air admitted through the vent hole 36 or vent plug 40, and distributes it among the air passages 50, all of which communicate with the mouthpiece cavity 56.

Figure 8:
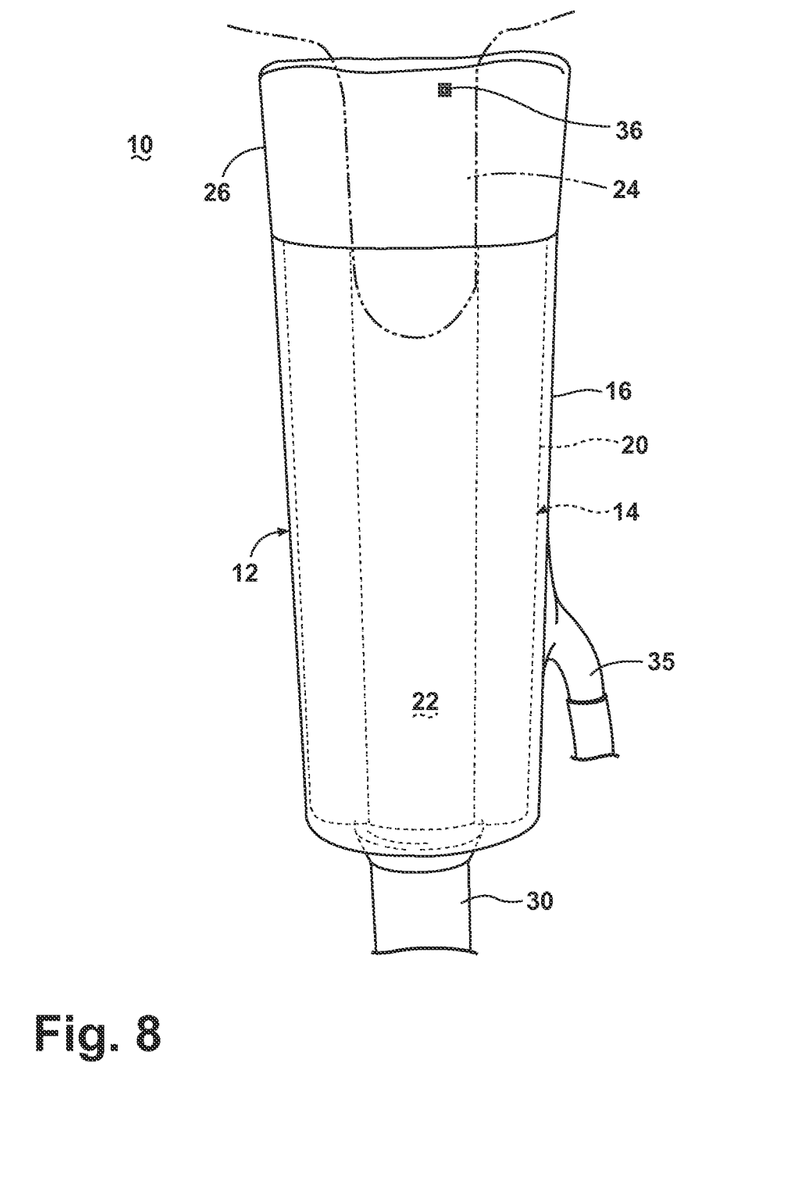
FIG. 8 is a perspective view similar to FIG. 2 showing a teat cup assembly according to a third embodiment of the invention.
Figure 9:
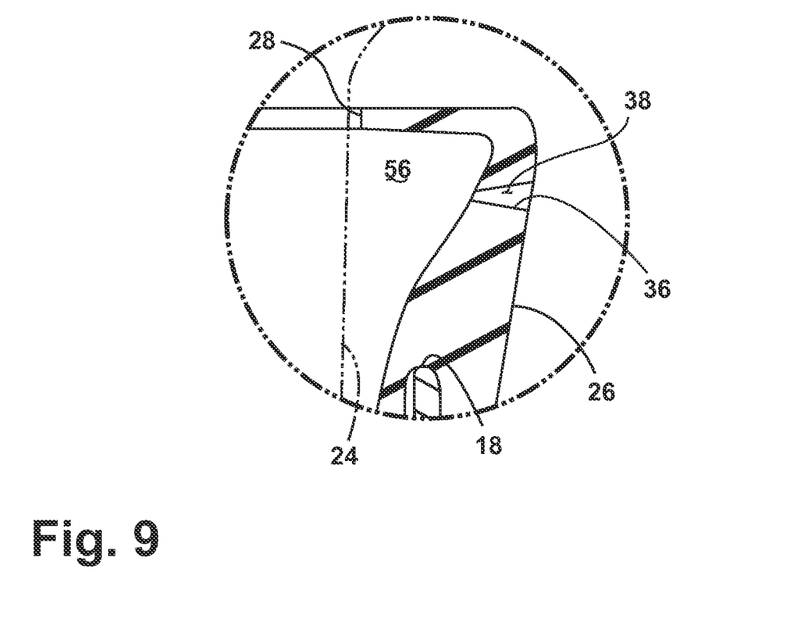
FIG. 9 is a vertical cross-sectional view similar to FIG. 4 of a teat cup assembly according to a fourth embodiment of the invention.
Figure 10:
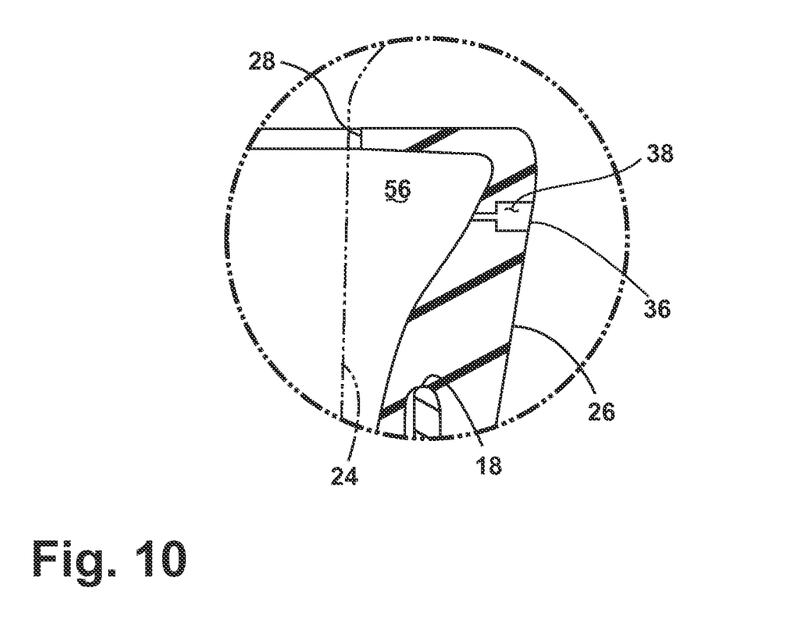
FIG. 10 is a vertical cross-sectional view similar to FIG. 4 of a teat cup assembly according to a fifth embodiment of the invention.

Alternative embodiments of the teat cup assembly 10 having differing configurations of the vent hole 36 in the mouthpiece 26 of the inflation 14 are shown in FIGS. 8-10. The vent hole 36 of the embodiment in FIGS. 1-7 is generally cylindrical, and examples of alternative forms for the vent hole 36 include a non-circular cross-section, as seen in FIG. 8, a tapered configuration, as depicted in FIG. 9, and a stepped configuration, as shown in FIG. 10.

There are many benefits to the teat cup assembly 10 and inflation 14 as described above. The metering of ambient air through the vent 36 or vent plug 40 into the mouthpiece cavity 56 produces a moderate vacuum within the mouthpiece cavity 56 that is intermediate to the milking vacuum and atmospheric pressure. This pressure differential provides adequate retention of the inflation 14 to the teat 24, while eliminating the tendency toward "ringing" and swelling of the teat 24 that can occur due to subjecting the portion of teat 24 within the mouthpiece cavity 56 to the full level of the milking vacuum. This reduction of mouthpiece cavity 56 vacuum, combined with the reduction of "ringing" and swelling of the teat noted above makes removal of the teat cup assemblies 10 (also called a "cluster") much easier and more comfortable for the cow. Also, the triangular inflation 14 grips the teat in a unique way that, even with reduced mouthpiece vacuum, reduces the risk of the inflation 14 slipping off the teat 24.

Another benefit of the teat cup assembly 10 is the flow of air through the inflation 14. Because the vent hole 36 or vent plug 40 is located above the tip of the teat 24, there is a continuous sweeping flow of air along the length of the teat 24. This flow cushions the teat from firm contact with the inflation barrel 20 and reduces the vacuum level to which the teat 24 is exposed. Additionally, the air flow within the barrel 20 beneath the teat 24 aids in moving the milk smoothly away from the teat 24, through the short milk tube 30, and on to the subsequent milking equipment. It is known that the recurrent wetting of the teat 24 contributes to the occurrence of bovine mastitis and this smooth movement of milk away from the teat 24 reduces the tendency for wetting of the teat 24 with back-washed milk, and also assists in maintaining milking vacuum at the teat end at a stable level which can be controlled at the level specified in the design of the machine. Further, it is contemplated that the invention also decreases the turbulence in the flowing milk, which translates to a reduction of air being incorporated into the milk, which, in turn, reduces the occurrence of rancidity.

While the invention has been specifically described in connection with certain specific embodiments thereof, it is to be understood that this description is by way of illustration and not of limitation. For example, the inflation can have more than one vent hole or vent plug. The invention is equally applicable to inflations of multi-sided cross-sections. Reasonable variation and modification are possible within the scope of the forgoing description and drawings without departing from the spirit of the invention, which is described in the appended claims.

What is claimed is:

1. A teat cup assembly for use in a milking machine for the milking of mammals comprising:
   a rigid teat cup shell having an elongated body with an annular wall terminating at an upper rim defining an open upper end; and
   a teat cup liner received within the open upper end of the teat cup shell, the teat cup liner constructed so there is communication between a mouthpiece and an inflation barrel when vacuum is applied to the teat cup liner, generating a continuous sweeping flow of air from the mouthpiece down along at least a portion of the length of the inflation barrel and a teat;
   the mouthpiece having an open top and a tubular side wall portion mounted to the rim of the teat cup shell, and the tubular side wall portion further includes a vent hole that is adapted to admit a controlled amount of ambient air into the mouthpiece of the liner; and
   the inflation barrel extending into the elongated body of the teat cup shell and connected to the mouthpiece to receive a teat when the barrel is in an uncollapsed condition and adapted to close onto the teat in a collapsed condition, the barrel having a triangular cross-sectional configuration that forms one or more air passages along at least a portion of the length thereof for flow of air from the mouthpiece when the barrel is in the collapsed condition to facilitate air and milk flow to and through a region beneath the teat to a milk tube.

2. The teat cup assembly according to claim 1 wherein the cross-sectional configuration of the barrel is triangular when the barrel is in the uncollapsed condition.

3. The teat cup assembly according to claim 2 wherein the one or more air passages are formed between the sides of the barrel when the barrel is in the collapsed condition.

4. The teat cup assembly according to claim 3 wherein the barrel forms three air passages between the sides of the barrel when the barrel is in the collapsed condition.

5. The teat cup assembly according to claim 1 wherein the barrel triangular cross-sectional configuration has three sides joined at three apices when the barrel is in the uncollapsed condition, and the one or more air passages are formed at the apices when the barrel is in the collapsed condition.

6. The teat cup assembly according to claim 5 wherein the apices have an increased thickness compared to the sides.

7. The teat cup assembly according to claim 5 wherein the one or more passages are formed between the apices and the teat along the length of the teat.

8. The teat cup assembly according to claim 5 wherein an air passage is formed at each of the apices.

9. The teat cup assembly according to claim 1 wherein the vent hole is cylindrical.

10. The teat cup assembly according to claim 1 wherein the vent hole is sized to admit from 1 to 15 liters of air per minute averaged over a complete cycle of a pulsator.

11. The teat cup assembly according to claim 1 wherein the vent hole has a diameter in the range of about 0.031 to 0.045 in. (0.7 to 1.0 mm).

12. The teat cup assembly according to claim 1 wherein the vent hole has a diameter of about 0.045 in. (1.0 mm).

13. A teat cup liner for use in a milking machine for the milking of mammals comprising: the teat cup liner constructed so there is communication between a mouthpiece and an inflation barrel when vacuum is applied to the teat cup liner, generating a continuous sweeping flow of air from the mouthpiece down along at least a portion of the length of the inflation barrel and a teat;
   the mouthpiece having an open top and a tubular side wall portion that is adapted to mount to a teat cup shell, and the tubular side wall portion further includes a vent hole that is adapted to admit a controlled amount of ambient air into the mouthpiece of the liner; and
   the inflation barrel connected to the mouthpiece and adapted to receive a teat when the barrel is in an uncollapsed condition and to close onto the teat in a collapsed condition, the barrel having a multi-sided cross-sectional configuration that forms at least three air passages along at least a portion of the length thereof from the mouthpiece through the barrel for flow of air from the mouthpiece through the barrel when the barrel is in the collapsed condition to facilitate air and milk flow to and through a region beneath the teat to a milk tube.

14. The teat cup liner according to claim 13 wherein the cross-sectional configuration of the barrel is multi-sided when the barrel is in the uncollapsed condition.

15. The teat cup liner according to claim 14 wherein the at least three air passages are formed between the sides of the multi-sided barrel when the barrel is in the collapsed condition.

16. The teat cup liner according to claim 15 wherein the barrel has three sides when the barrel is in the uncollapsed condition and forms three air passages between the three sides of the barrel.

17. The teat cup liner according to claim 16 wherein the three air passages are formed between each of the three sides when the barrel is in the collapsed condition.

18. The teat cup liner according to claim 13 wherein the vent hole is cylindrical.

19. The teat cup liner according to claim 13 wherein the vent hole is tapered.

20. The teat cup liner according to claim 13 wherein the vent hole is stepped.

21. The teat cup liner according to claim 13 wherein the vent hole has a non-circular cross-section.

22. The teat cup liner according to claim 13 wherein the vent hole is sized to admit from 1 to 15 liters of air per minute averaged over a complete cycle of a pulsator.

23. The teat cup liner according to claim 13 wherein the vent hole has a diameter in the range from about 0.022 to about 0.09 in. (0.5 to 2.0 mm).

24. The teat cup liner according to claim 13 wherein the vent hole has a diameter in the range of about 0.031 to 0.045 in. (0.7 to 1.0 mm).

25. The teat cup liner according to claim 13 wherein the vent hole has a diameter of about 0.045 in. (1.0 mm).

26. A teat cup comprising a rigid teat cup shell and a teat cup liner according to claim 13.

* * * * *